Jan. 30, 1968 E. P. BULLARD III 3,366,393
QUICK-CHANGE CHUCK JAW
Filed June 2, 1965
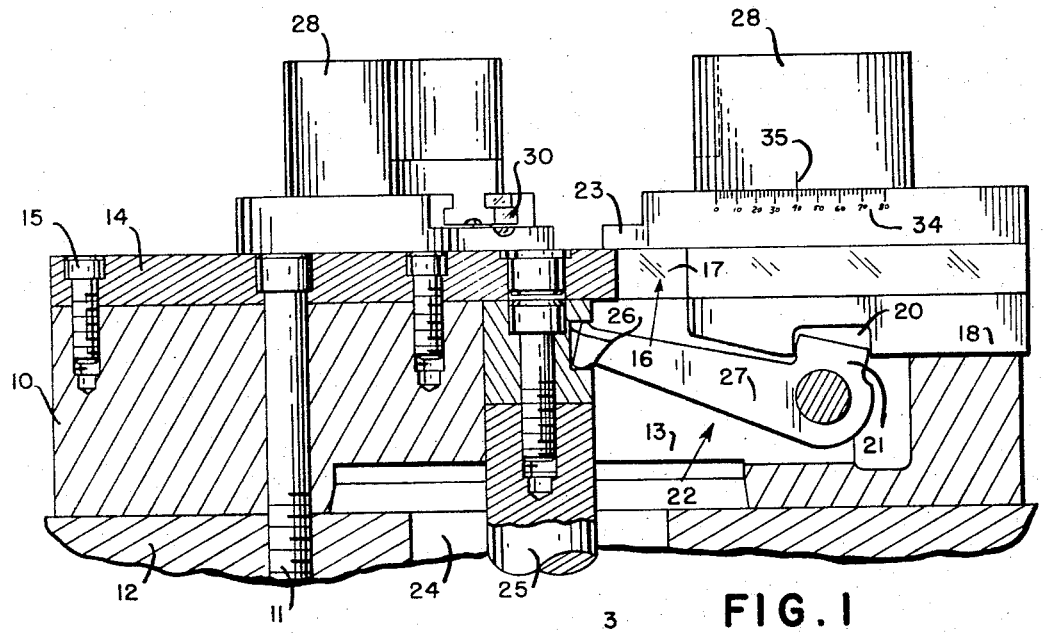
FIG. 1
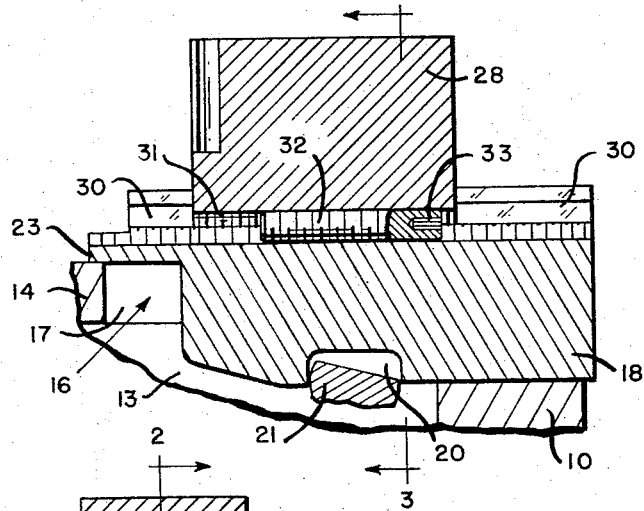
FIG. 2
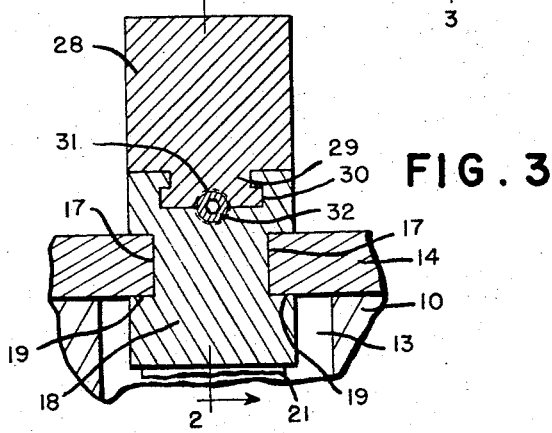
FIG. 3
INVENTOR.
EDWARD P. BULLARD III
BY
ATTORNEY.

United States Patent Office 3,366,393
Patented Jan. 30, 1968

3,366,393
QUICK-CHANGE CHUCK JAW
Edward P. Bullard III, Fairfield, Conn., assignor to The Bullard Company, Bridgeport, Conn., a corporation of Connecticut
Filed June 2, 1965, Ser. No. 460,632
6 Claims. (Cl. 279—111)

ABSTRACT OF THE DISCLOSURE

A work holding chuck for a machine tool in which bottom jaw members mounted on a chuck body are radially movable in unison relative thereto, and top jaws for engaging a workpiece are removably mounted on the bottom jaws. Each set of top and bottom jaws is provided with a threaded screw element disposed in a threaded passage extending radially between the jaws so that portions of the passage are formed in both jaws, which keys the jaws together and permits the accurate location of the top jaw in any one of a number of precise radial positions relative to the bottom jaw separated by the pitch of the threaded screw element.

---

This invention relates to chucks for machine tools, and particularly to an improved quick-change top jaw construction for such chucks.

Recent preset tooling methods for machine tools contemplate rapid change-over of the tooling for one job to that for another. Consistent with such quick change-over is a demand for quick-change top jaw constructions for chucks that hold the work upon which machining operations are performed.

The principal object of this invention is to provide a quick-change top jaw construction for machine tool chucks.

Another object of the invention is to provide such a top jaw construction that will be simple in construction and reliable in operation.

Still another object of the invention is to provide such a quick-change top jaw construction that has a single threaded element to retain it in a preset position.

In one aspect of the invention, a chuck may comprise a body portion having chambers therein at 120° intervals for the reception of bottom jaws. The top of the body may be covered by a plate having radial slots therein in alignment with the recesses or chambers but narrower than such recesses so as to provide ways adapted to mate with ways on the sides of the bottom jaws.

In another aspect of the invention, each recess in the body portion may pivotally support a bell crank lever, the end of one arm of which engages a notch in the bottom jaw, and the end of the other arm of which engages a notch in a drawbar for reciprocating the bottom jaws radially.

In a further aspect of the invention, the top surface of the bottom jaw may be provided with a radial T-slot for slidingly receiving a top jaw having a bottom construction that mates with the T-slot in the bottom jaw.

In a still further aspect of the invention, there may be provided a radial, threaded passage, one half of which (longitudinally) is in the top of the bottom jaw, and the mating half is in the bottom of the top jaw.

In another aspect of the invention, a screw is adapted to be threaded into said passage to lock the top jaw to the bottom jaw at any desired radially adjusted position of the top jaw on the bottom jaw.

In still another aspect of the invention, indicating means may be provided on the bottom and top jaws to facilitate setting of the top jaws.

The above, other objects and novel features of the improved chuck will become apparent from the following specification and accompanying drawing which are merely exemplary.

In the drawing:

FIG. 1 is a sectional elevational view of a chuck to which the principles of the invention have been applied;

FIG. 2 is a sectional view taken substantially along line 2—2 of FIG. 3, showing the threaded elements in enlarged form; and FIG. 3 is a sectional view taken substantially along line 3—3 of FIG. 2.

Referring to the drawing, the principles of the invention are shown as applied to a work-holding chuck including a body portion 10 that is fixed by screws 11 to a top disk 12 integral with a spindle (not shown). The body 10 includes three open top, cored out recesses 13 (only one being shown in FIG. 1). A plate 14 is fixed to the top of body 10 by screws 15, and it includes radial slots 16 that are aligned with, and partially overlap the open tops of recesses 13, forming parallel ways 17.

Bottom jaws 18 are provided with parallel grooves 19 adapted to be received by the ways 17 on plate 14. The bottom jaws 18 include a transverse slot 20 adapted to receive an arm 21 of a bell crank lever 22. The jaws 18 also include a portion 23 that lies over the inner portion of the radial slots 16 at all times, preventing the admission of dirt and chips into the recesses 13 where the operating mechanism of the chuck jaws is located.

The spindle and top disk 12 include an axial passage 24 through which a drawbar 25 extends, which bar may, if desired, be power-operated. The upper end of the drawbar 25 includes a groove 26 that engages the outer end of bell crank lever arm 27 so that reciprocable movement of bar 25 reciprocates bottom jaw 18 along the ways 17 in plate 14.

Referring to FIGS. 2 and 3, a top jaw 28 is mounted on the bottom jaw 18. In the embodiment disclosed, it is shown as a soft jaw blank, i.e., one that is machined on the chuck to receive a given workpiece so that precision gripping surfaces are provided.

The top jaw 28 is provided with a T-shaped bottom portion 29 that slidingly engages a T-slot 30 formed in the top surface of the bottom jaw 18. A threaded passage 31 extends axially along the bottom jaw 18 and top jaw 28 such that one half of the thread is in the bottom of the top jaw 28, and the mating half is in the top surface of the bottom jaw 18.

A threaded rod or bolt 32 is threaded into the threaded hole 31 and effectively locks the top jaw 28 to the bottom jaw 18. In the embodiment disclosed, the screw 32 is headless and is provided with a square hole 33 adapted to receive a tool to withdraw and insert said screw.

Referring to FIG. 1, indicia 34 are provided along the side of each bottom jaw that cooperate with an index line 35 on top jaw 28 for facilitating the accurate location of top jaw 28 along bottom jaw 18. When it is desired to reset top jaw 28, it is only necessary to remove screw 32, slide jaw 28 to the desired location and re-insert screw 32. The minimum adjustment of the top jaw along the bottom jaw is the pitch of the threads of screw 32, which in the embodiment shown is 0.050 inch.

Although the various features of the improved chuck have been shown and described in detail to fully disclose one embodiment of the invention, it will be evident that changes may be made in such details, and certain features may be used without others without departing from the principles of the invention.

What is claimed is:

1. In a chuck, the combination comprising a body portion; bottom jaws mounted within said body portion for sliding movement along radial paths within said body portion; means for reciprocating said bottom jaw; a top mounted for sliding movement along radial paths along said bottom jaws; a threaded passage extending radially of said body portion for each of said top and bottom jaws, a portion of which threaded passage is in the bottom jaw and the remaining portion of which threaded passage is in the top jaw; and a single threaded element within each threaded passage.

2. In a chuck, the combination comprising a body portion; bottom jaws mounted within said body portion for sliding movement along radial paths within said body portion; bell crank levers within said body portion, one arm of each of which levers engages a corresponding bottom jaw, and the other arm engaging a common drawbar; a top jaw mounted for sliding movement along radial paths along said bottom jaws; a threaded passage extending radially of said body portion for each of said top and bottom jaws, a portion of which threaded passage is in the bottom jaw and the remaining portion of which threaded passage is in the top jaw; and a single threaded element within each threaded passage.

3. In a chuck, the combination comprising a body portion; bottom jaws mounted within said body portion for sliding movement along radial paths within said body portion; means for reciprocating said bottom jaws; a top jaw mounted for sliding movement along radial paths along said bottom jaws; a threaded passage extending radially of said body portion for each of said top and bottom jaws, a portion of which threaded passage is in the bottom jaw and the remaining portion of which threaded passage is in the top jaw; a single threaded element within each threaded passage; and an index line on one of said jaws and indicia on the other for facilitating relative adjustment therebetween.

4. In a chuck, the combination comprising a body portion; bottom jaws mounted within said body portion for sliding movement along radial paths within said body portion; bell crank levers within said body portion, one arm of each of which levers engages a corresponding bottom jaw, and the other arm engaging a common drawbar; a top jaw mounted for sliding movement along radial paths along said bottom jaws; a threaded passage extending radially of said body portion for each of said top and bottom jaws, a portion of which threaded passage is in the bottom jaw and the remaining portion of which threaded passage is in the top jaw; a single threaded element within each threaded passage; and an index line on one of said jaws and indicia on the other for facilitating relative adjustment therebetween.

5. In a chuck, the combination comprising a body portion; three recessed chambers within said body portion at 120° intervals thereabout; a top plate on said body portion having radial slots therein that are aligned with, but narrower than, said recesses so that the walls of said slots form radial ways on each side of each recessed chamber; a bottom jaw for each recessed chamber having parallel ways along each side thereof adapted slidingly to mate with the ways on said top plate; a radial T-slot in the top surface of each of said bottom jaws; a top jaw for each bottom jaw including a T-construction on its bottom adapted slidingly to mate with the T-slot in its corresponding bottom jaw; a threaded passage extending radially of said body portion for each of said top and bottom jaws, a portion of which threaded passage is in the bottom jaw and the remaining portion of which threaded passage is in the top jaw; and a single threaded element within each threaded passage.

6. In a chuck, the combination comprising a body portion; three recessed chambers within said body portion at 120° intervals thereabout; a top plate on said body portion having radial slots therein that are aligned with, but narrower than, said recesses so that the walls of said slots form radial ways on each side of each recessed chamber; a bottom jaw for each recessed chamber having parallel ways along each side thereof adapted slidingly to mate with the ways on said top plate; a radial T-slot in the top surface of each of said bottom jaws; a top jaw for each bottom jaw including a T-construction on its bottom adapted slidingly to mate with the T-slot in its corresponding bottom jaw; a threaded passage extending radially of said body portion for each of said top and bottom jaws, a portion of which threaded passage is in the bottom jaw and the remaining portion of which threaded passage is in the top jaw; a single threaded element within each threaded passage; and an index line on one of said jaws and indicia on the other for facilitating relative adjustment therebetween.

References Cited

UNITED STATES PATENTS

| | | | |
|---|---|---|---|
| 1,446,061 | 2/1923 | Pratt | 279—118 |
| 1,446,062 | 2/1923 | Pratt | 279—118 |
| 1,455,351 | 5/1923 | Olson | 279—119 |
| 1,623,365 | 4/1927 | Smith | 151—8 |
| 2,993,701 | 7/1961 | Arnold | 279—123 |

ROBERT C. RIORDON, *Primary Examiner.*

E. A. CARPENTER, *Assistant Examiner.*